United States Patent
Lee et al.

(10) Patent No.: US 9,945,531 B2
(45) Date of Patent: Apr. 17, 2018

(54) SHIELD DRIVING DEVICE FOR HEADLAMP

(71) Applicant: Hyundai Motor Company, Seoul (KR)

(72) Inventors: Seong Hoon Lee, Suwon-si (KR); Young Sub Oh, Suwon-si (KR); Su Ho Bae, Gyeongsan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/286,453

(22) Filed: Oct. 5, 2016

(65) Prior Publication Data
US 2017/0198878 A1    Jul. 13, 2017

(30) Foreign Application Priority Data
Jan. 8, 2016    (KR) .................. 10-2016-0002636

(51) Int. Cl.
*F21S 8/10* (2006.01)
*B60Q 1/04* (2006.01)
*B60Q 1/14* (2006.01)

(52) U.S. Cl.
CPC ............ *F21S 48/1794* (2013.01); *B60Q 1/04* (2013.01); *B60Q 1/1438* (2013.01); *F21S 48/1225* (2013.01); *F21S 48/1784* (2013.01); *B60Q 2200/30* (2013.01)

(58) Field of Classification Search
CPC ............... F21S 48/1784; F21S 48/1794; F21S 48/1225; B60C 1/04; B60C 1/1438; B60C 2200/30
USPC ................................. 362/512, 513, 538, 539
See application file for complete search history.

(56) References Cited

U.S. PATENT DOCUMENTS

| | | | | |
|---|---|---|---|---|
| 5,373,424 A | * | 12/1994 | Ishikawa | F21S 48/1794 362/282 |
| 8,459,849 B2 | * | 6/2013 | Grimm | F21S 48/1794 362/282 |
| 2005/0024889 A1 | * | 2/2005 | Sugimoto | B60Q 1/085 362/539 |
| 2005/0201117 A1 | * | 9/2005 | Sugimoto | F21S 48/1794 362/539 |

(Continued)

FOREIGN PATENT DOCUMENTS

| | | |
|---|---|---|
| JP | H0736305 A | 2/1995 |
| JP | 2006-040839 A | 2/2006 |

(Continued)

*Primary Examiner* — Laura Tso
(74) *Attorney, Agent, or Firm* — Morgan, Lewis & Bockius LLP (57) ABSTRACT

A shield driving device for a headlamp, which operates a rotary shield that selectively blocks a portion of light emitted from a light source to an aspherical lens, the shield driving device may include the rotary shield disposed in front of the light source, and performing a closing operation for blocking the portion of light from the light source, and an opening operation for unblocking the portion of the light while rotating about a rotating shaft, a shield controlling cam disposed below the rotary shield to be rotatable in a state of being in contact with a cam contact portion of the rotary shield, and rotating simultaneously with the cam contact portion by frictional force caused by contact, and an actuator which transmits rotational power to the shield controlling cam.

3 Claims, 6 Drawing Sheets

(56) References Cited

U.S. PATENT DOCUMENTS

| | | | | |
|---|---|---|---|---|
| 2009/0154187 A1* | 6/2009 | Kim | ................ | B60Q 1/085 |
| | | | | 362/539 |
| 2011/0286230 A1* | 11/2011 | Huang | ................ | F21S 48/1773 |
| | | | | 362/539 |
| 2012/0113663 A1* | 5/2012 | Kim | ................ | F21S 48/1778 |
| | | | | 362/513 |

FOREIGN PATENT DOCUMENTS

| JP | 2013065504 A | 4/2013 |
|---|---|---|
| KR | 10-2013-0071803 A | 7/2013 |
| KR | 10-2013-0110106 A | 10/2013 |
| KR | 10-2014-0014513 A | 2/2014 |
| KR | 10-2015-0007071 A | 1/2015 |
| KR | 10-2015-0017217 A | 2/2015 |

\* cited by examiner

SHIELD DRIVING DEVICE FOR HEADLAMP

CROSS-REFERENCE TO RELATED APPLICATION

The present application claims priority to Korean Patent Application No. 10-2016-0002636, filed Jan. 8, 2016, the entire contents of which is incorporated herein for all purposes by this reference.

BACKGROUND OF THE INVENTION

Field of the Invention

Various embodiments of the present invention relate to a shield driving device for a headlamp. More particularly, to a shield driving device for a headlamp, which is capable of implementing a high beam mode and a low beam mode by controlling rotational motion of a shield for a headlamp.

Description of Related Art

In general, a vehicle is provided with lighting devices which have a lighting function that allows a driver to easily detect objects positioned in a traveling direction of the vehicle when the vehicle is driven at night, and a signal function that informs drivers or other road users of a driving state of the vehicle.

Among the lighting devices for a vehicle, headlamps, which are also called headlights, are mounted at two front sides of the vehicle and illuminate a way in front of the vehicle when the vehicle travels at night, thereby ensuring visibility of a driver in a traveling direction.

The headlamp should not cause driving hindrance such as light blindness of a driver of an oncoming vehicle that faces the host vehicle, and to this end, a mode of the headlamp is changed to a low beam mode or a high beam mode by being manipulated by the driver.

Recently, in order to change and selectively use the low and high beam modes, a bi-functional headlamp is sometimes applied, which is provided with a shield driving device (or light distribution direction changing device) including a rotary shield, thereby emitting a high beam and a low beam by using a single light source.

The bi-functional headlamp emits the high beam or the low beam by adjusting light reflected by a reflective surface of a reflector by using the shield driving device, and in this case, the shield driving device changes a rotational position of the shield by using an actuator, thereby directing the light only downward by an operation of closing the shield (low beam mode), or directing the light both upward and downward by an operation of opening the shield (high beam mode).

In the case of the bi-functional headlamp, a large amount of noise does not occur when the shield is rotated to an open position by the actuator, but noise occurs when electric power being applied to the actuator is shut off, and the shield is rotated to a closed position by restoring force of a return spring, and thus collides with a damper.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shield driving device for a headlamp, which is capable of effectively reducing the occurrence of impact and noise when the shield is opened and closed, by implementing a new type of shield driving method to which a cam type damper means is applied, which may control motion of the shield through frictional contact during operations of opening and closing the rotary shield.

According to various aspects of the present invention, a shield driving device for a headlamp, which operates a rotary shield that selectively blocks a portion of light emitted from a light source to an aspherical lens may include the rotary shield disposed in front of the light source, and performing a closing operation for blocking the portion of light from the light source, and an opening operation for unblocking the portion of the light while rotating about a rotating shaft, a shield controlling cam disposed below the rotary shield to be rotatable in a state of being in contact with a cam contact portion of the rotary shield, and rotating simultaneously with the cam contact portion by frictional force caused by contact, and an actuator which transmits rotational power to the shield controlling cam.

The cam contact portion may be formed integrally with a lower portion of the rotating shaft of the rotary shield to be rotatable simultaneously with the rotary shield, and may include a lower end surface which contacts the shield controlling cam and is formed as a curved surface.

The cam contact portion may be formed integrally with a lower portion of the rotating shaft of the rotary shield to be rotatable simultaneously with the rotary shield, front and rear central portions of a lower end surface of the cam contact portion which is in contact with the shield controlling cam may have a curved surface, and front and rear edge portions of the lower end surface of the cam contact portion may have a flat surface.

The shield controlling cam may have an outer circumferential surface which may include a first flat surface portion which is in at least one of line-to-line contact and surface contact with the cam contact portion during an operation of closing the rotary shield, a second flat surface portion which is in at least one of line-to-line contact and surface contact with the cam contact portion during an operation of opening the rotary shield, and a curved surface portion formed between the first flat surface portion and the second flat surface portion and in line-to-line contact with the cam contact portion during an operation of changing closed and opened states of the rotary shield.

A return spring, which produces elastic restoring force by being compressed as the closed state of the rotary shield is changed to the opened state, may be disposed on the rotating shaft of the rotary shield.

According to the shield driving device of the various embodiments of the present invention, a cam type damper means is applied which controls motion of the shield while maintaining a frictional contact state during operations of opening and closing the shield for implementing a high beam mode and a low beam mode of the headlamp, thereby remarkably reducing the occurrence of impact and noise, and ensuring operational quality of the shield.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
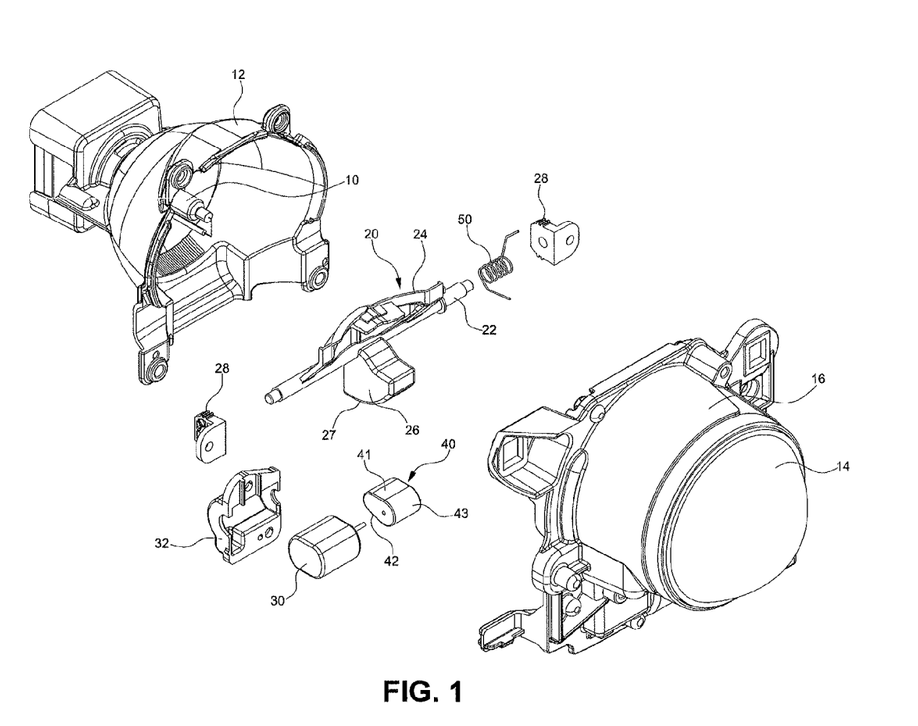
FIG. 1 is an exploded perspective view illustrating a shield driving device of a headlamp according to various embodiments of the present invention.
Figure 2:
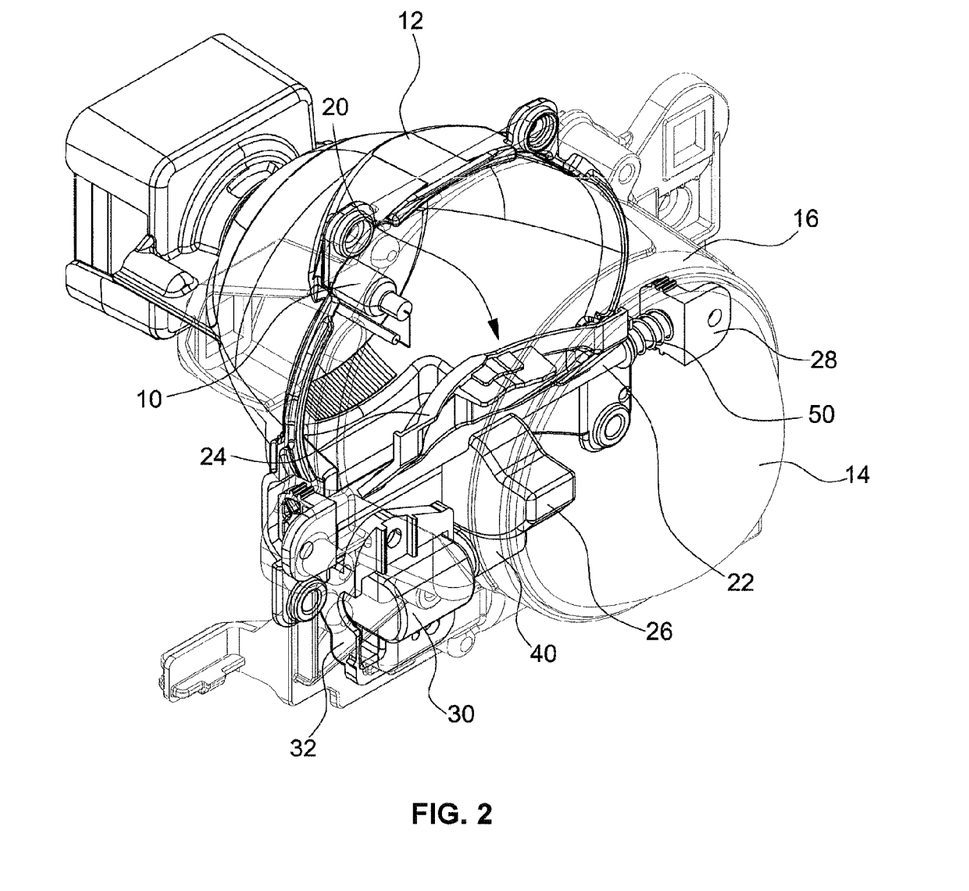
FIG. 2 is a coupled perspective view illustrating the shield driving device according to various embodiments of the present invention.

As illustrated in FIGS. 1 and 2, the headlamp includes a light source 10 which emits light, a reflector 12 which reflects the light emitted from the light source 10, an aspherical lens 14 which allows the light emitted and reflected by the reflector 12 to go straight and be discharged to the outside, a rotary shield 20 which is rotated to block or unblock some of the light (light which is directed upward) entering the aspherical lens 14, and a lens holder 16 which fixedly supports the aspherical lens 14 forward of the light source 10.

The headlamp has a shield driving device for rotating the rotary shield 20 at a predetermined angle in order to block and unblock some of the light which is emitted from the light source 10 and enters the aspherical lens 14, and the shield driving device includes an actuator 30 which provides power for rotating the rotary shield 20, a shield controlling cam 40 which controls the rotational motion of the rotary shield 20 by using the power generated by the actuator 30, and a return spring 50 which provides elastic restoring force for restoring the shield 20 which has been rotated by power from the actuator 30.

The rotary shield 20 is disposed in front of the light source 10 installed and mounted by penetrating a rear end of the reflector 12, and the rotary shield 20 is positioned rearward of the aspherical lens 14, and rotatable about a rotating shaft 22 which is rotatably supported by mounting brackets 28 attached to two rear ends of the lens holder 16.

Based on a rotation angle of the rotary shield 20, the rotary shield 20 may be in a closed state in which some of the light from the light source 10 is blocked, and in an opened state in which the light is not blocked.

Specifically, the rotary shield 20 is provided with a shield wing 24 and a cam contact portion 26 provided on the rotating shaft 22, the shield wing 24, which performs a closing operation for blocking the light and an opening operation for unblocking the light, is formed at an upper side of the rotating shaft 22 that extends straight, and the cam contact portion 26, which is in contact with the shield controlling cam 40 and rotates at a predetermined angle by power from the actuator 30, is formed at a lower side of the rotating shaft 22.

The shield wing 24 and the cam contact portion 26 are simultaneously rotatably formed integrally with the rotating shaft 22, and the shield controlling cam 40 is connected to and contacts a lower end surface 27 of the cam contact portion 26 in the form of a curved surface.

In other words, the cam contact portion 26 is formed integrally with a lower portion of the rotating shaft 22 so as to be rotatable simultaneously with the rotary shield 20, and the lower end surface 27, which is in contact with the shield controlling cam 40, is formed to have a curved surface.

In this case, in order to form surface-to-surface contact between the cam contact portion 26 and the shield controlling cam 40 during the operations of closing and opening the rotary shield 20, front and rear edge portions of the lower end surface 27 of the cam contact portion 26 may be processed to have a flat surface.

In other words, front and rear central portions of the lower end surface 27 of the cam contact portion 26 are processed to have a curved surface, and the front and rear edge portions of the lower end surface 27 are processed to have a flat surface.

The shield controlling cam 40 is installed between the cam contact portion 26 and the actuator 30, rotates by rotational power from the actuator 30, and simultaneously rotates the cam contact portion 26 by frictional force caused by contact, and the shield controlling cam 40 rotates while maintaining a contact state with the cam contact portion 26, and simultaneously, rotates the cam contact portion 26 in a direction opposite to a rotation direction of the shield controlling cam 40.

As illustrated in FIGS. 1 to 6, the shield controlling cam 40 is disposed on a lower portion of the rotary shield 20 and installed to be rotatable in a state of being in contact with the cam contact portion 26, and the shield controlling cam 40 has an outer circumferential surface in order to maintain the contact state with the lower end surface 27 of the cam contact portion 26, and the outer circumferential surface includes a first flat surface portion 41 which surface contacts the cam contact portion 26 when the rotary shield 20 is in the closed state, a second flat surface portion 42 which surface contacts the cam contact portion 26 when the rotary shield 20 is in the opened state, and curved surface portions 43 which are in line-to-line contact with the cam contact portion 26 when the operation is changed between the closed and opened states of the rotary shield 20.

Figure 6:
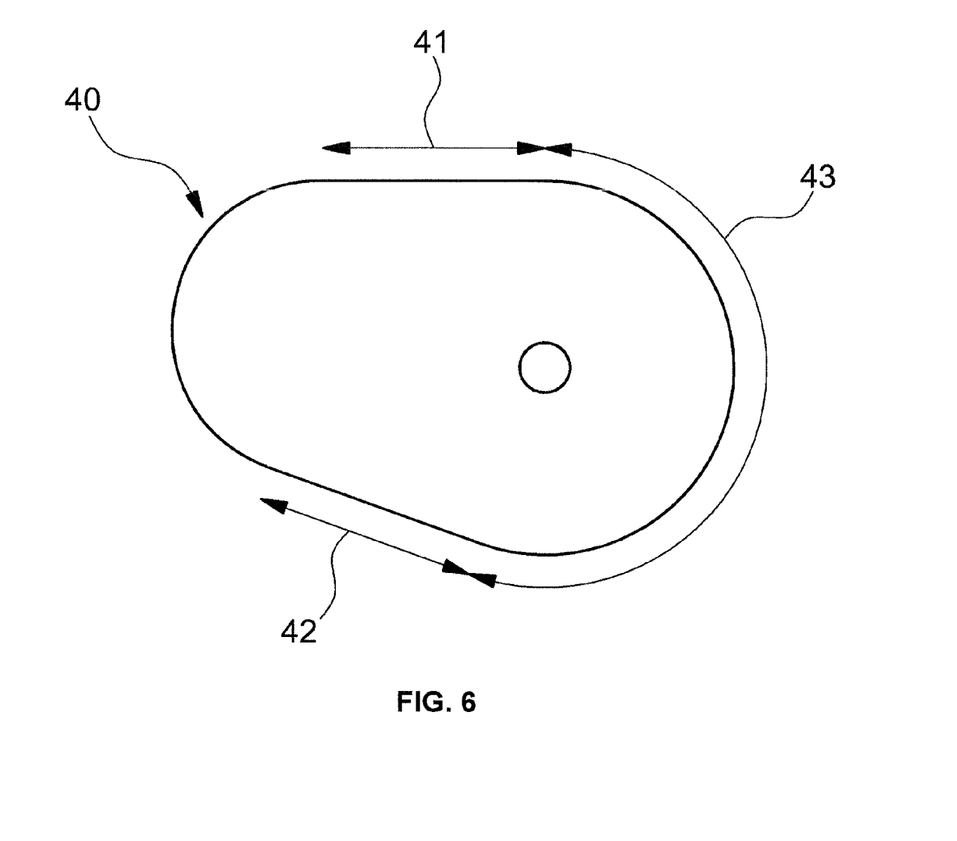
FIG. 6 is a view illustrating divided contact sections of a cam which comes into frictional contact with the shield in accordance with rotational motion of the shield in the shield driving device according to various embodiments of the present invention.

In other words, the shield controlling cam 40 has the outer circumferential surface including the first flat surface portion 41, the second flat surface portion 42, and the curved surface portions 43 connected between the first flat surface portion 41 and the second flat surface portion 42 in order to always maintain the contact state with the cam contact portion 26 when the shield controlling cam 40 is rotated and stopped.

The first flat surface portion 41 is a section in which the operation of closing the rotary shield 20 is completed, and when the cam contact portion 26 surface contacts the first flat surface portion 41, the shield wing 24 of the rotary shield 20 blocks some of the light (light directed upward) from the light source 10.

The second flat surface portion 42 is a section in which the operation of opening the rotary shield 20 is completed, and when the cam contact portion 26 surface contacts the second flat surface portion 42, the shield wing 24 of the rotary shield 20 unblocks the light so that some of the light (light directed upward) from the light source 10 may pass the rotary shield 20.

The curved surface portion 43 is a section in which an operation of changing the closed and opened states of the rotary shield 20 is carried out, and while the closed state of the rotary shield 20 is changed to the opened state or the opened state is changed to the closed state, the line-to-line contact between the cam contact portion 26 and the curved surface portion 43 of the rotating shield controlling cam 40 is maintained.

The shield controlling cam 40 is rotated about the rotating shaft of the actuator 30, and the curved surface portion 43 is a curved surface surrounded by lines at the same distance from the rotating shaft of the actuator 30.

Meanwhile, the return spring 50, which produces elastic restoring force by being compressed when the closed state of the rotary shield 20 is changed to the opened state, is installed between the rotating shaft 22 of the rotary shield 20 and the mounting bracket 28, and when power being transmitted from the actuator 30 to the shield controlling cam 40 is shut off, the return spring 50 restores the rotary shield 20 to the closed state by using elastic restoring force.

Referring to FIG. 2, the actuator 30 is fixedly attached by a mounting bracket 32 coupled to a front side of the reflector 12, and disposed in a straight line together with the shield controlling cam 40 coaxially connected with the rotating shaft of the actuator 30.

Hereinafter, operational states of the rotary shield using the shield driving device, which is configured as described above, will be described with reference to FIGS. 3 to 5.

Figure 3:
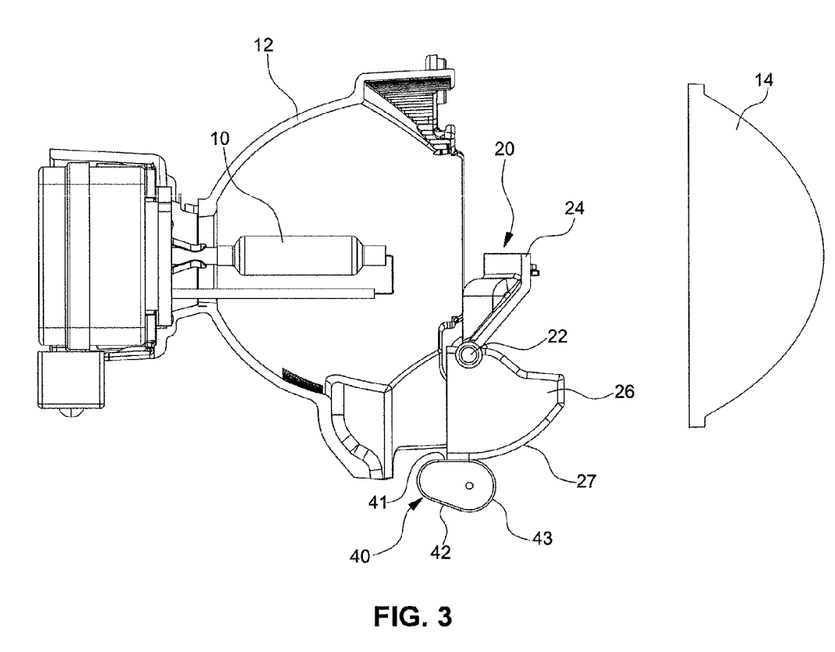
FIG. 3 is a side view illustrating a shield-closed state of the shield driving device according to various embodiments of the present invention.

First, the attached FIG. 3 illustrates the closed state of the rotary shield.

Referring to FIG. 3, a rear edge portion of the lower end surface 27 of the cam contact portion 26 of the rotary shield 20, that is, a rear flat surface portion of the cam contact portion 26 surface contacts the first flat surface portion 41 of the shield controlling cam 40, and rotational power is not supplied from the actuator 30, and as a result, the closed state is supported and maintained by spring force of the return spring 50.

Therefore, downward directed light (light for a low beam) of the light from the light source 10, which is reflected by the reflector 12 at the rear side and directed toward the aspherical lens 14 at the front side, is directed forward and then discharged to the outside through the aspherical lens 14, and upward directed light (light for a high beam) of the light from the light source 10 is directed forward but blocked by the shield wing 24 of the rotary shield 20, and cannot be discharged to the outside.

Figure 4:
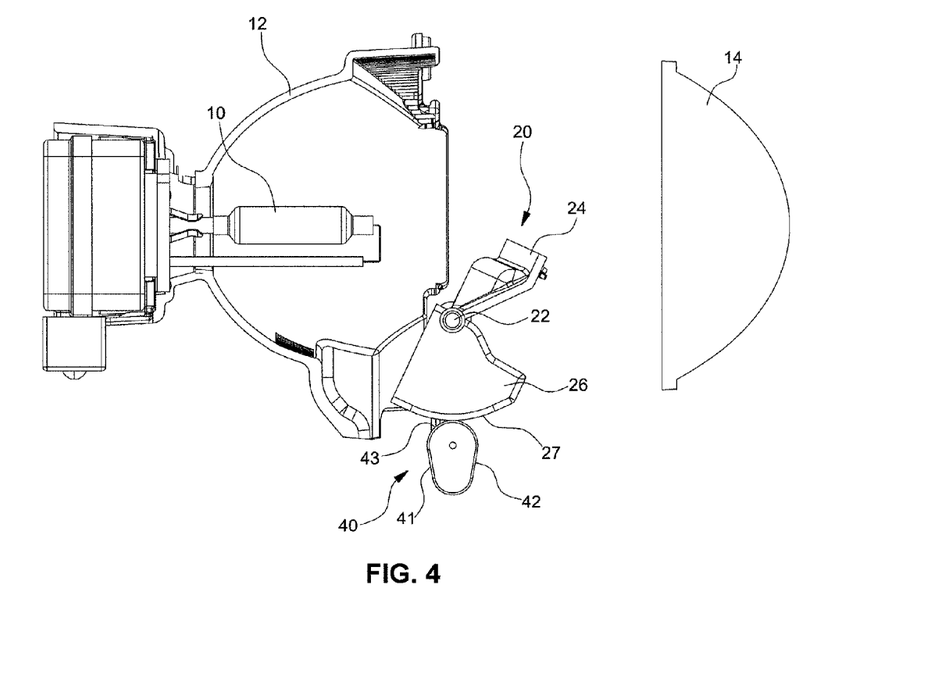
FIG. 4 is a side view illustrating an operational state in which a shield is being opened by the shield driving device according to various embodiments of the present invention.

The attached FIG. 4 illustrates an operation of changing the closed state of the rotary shield to the opened state.

Referring to FIG. 4, the closed state of the rotary shield 20 is being changed to the opened state, and a central portion of the lower end surface 27 of the cam contact portion 26, that is, a central curved surface portion of the cam contact portion 26 is in line-to-line contact with the curved surface portion 43 of the shield controlling cam 40.

In this case, the shield controlling cam 40 is rotated at a predetermined angle in a direction for performing the operation of opening the rotary shield 20 by receiving rotational power from the actuator 30, and while the shield controlling cam 40 rotates, the cam contact portion 26 of the rotary shield 20 angularly rotates in an opposite direction to the shield controlling cam 40 by frictional force caused by contact while maintaining the line-to-line contact with the curved surface portion 43 of the shield controlling cam 40.

As the rotary shield 20 rotates as described above, the return spring 50, which has two opposite ends supported between the rotating shaft 22 of the rotary shield 20 and the mounting bracket 28, produces elastic restoring force by being compressed.

Therefore, the downward directed light of the light from the light source 10, which is reflected by the reflector 12 at the rear side and directed toward the aspherical lens 14 at the front side, is all directed forward and then discharged to the outside through the aspherical lens 14, and only some of the upward directed light of the light from the light source 10 is directed forward and then discharged to the outside through the aspherical lens 14.

Figure 5:
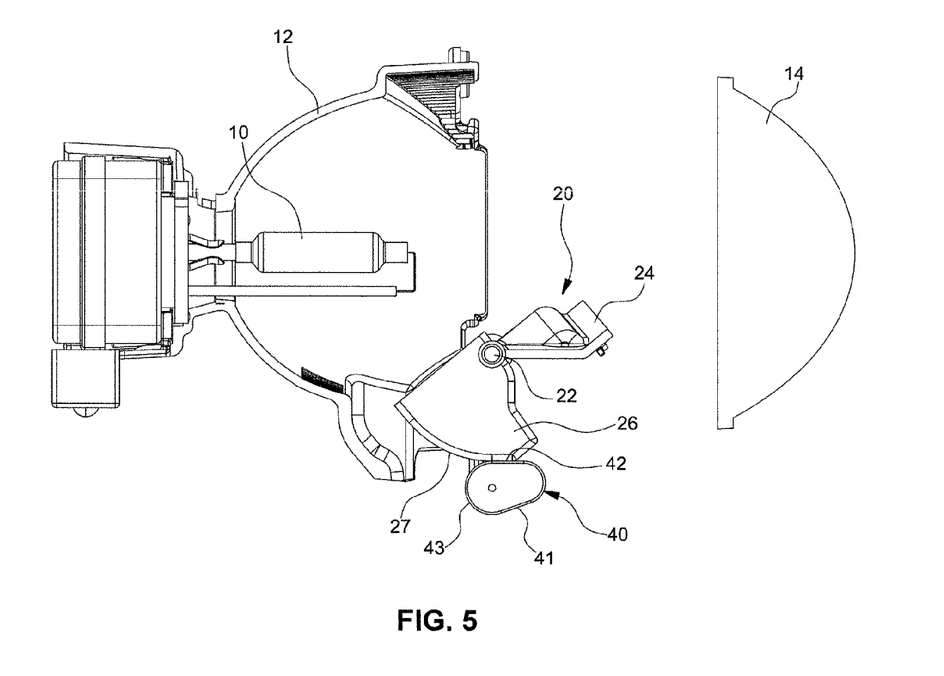
FIG. 5 is a side view illustrating a shield-opened state of the shield driving device according to various embodiments of the present invention.

The attached FIG. 5 illustrates the opened state of the rotary shield.

Referring to FIG. 5, the rotary shield 20 is in the opened state, and the rotation of the rotary shield 20 is stopped, a front edge portion of the lower end surface 27 of the cam contact portion 26, that is, a front flat surface portion of the cam contact portion 26 surface contacts the second flat surface portion 42 of the shield controlling cam 40.

In this case, since the rotary shield 20 receives elastic restoring force of the return spring 50 in a rotation direction of blocking light, the actuator 30 still operates to maintain the opened state of the rotary shield 20.

Therefore, the downward directed light and the upward directed light of the light from the light source 10, which is reflected by the reflector 12 at the rear side and directed toward the aspherical lens 14 at the front side, are all directed forward and then discharged to the outside through the aspherical lens 14.

Thereafter, when the actuator 30 is stopped, the rotary shield 20 is restored to the closed state by elastic restoring force of the return spring 50, and in this case, the rotary shield 20 begins to rotate by starting with the second flat surface portion 42, rotates while maintaining the line-to-line contact with the curved surface portion 43, and then surface contacts the first flat surface portion 41, such that the rotary shield 20 is restored to the closed state.

As described above, the rotary shield 20 is rotated simultaneously with the shield controlling cam 40 through the cam contact portion 26 by frictional force caused by contact, and thus the rotary shield 20 may be operated without impact and noise while the closed and opened states are changed.

In more detail, the shield controlling cam 40 is in contact with the cam contact portion 26 of the rotary shield 20, and the operation of opening the rotary shield 20 is carried out by rotating the rotary shield 20 using frictional force caused by contact, and after the rotary shield 20 is fully opened, the cam contact portion 26 is stopped in the surface contact state with the second flat surface portion 42 of the shield controlling cam 40, and in this case, the line-to-line contact state between the cam contact portion 26 and the curved surface portion 43 is smoothly changed to the surface contact state between the cam contact portion 26 and the second flat surface portion 42 without impact, such that operational noise is not generated.

When the rotary shield 20 is closed again, power from the actuator 30 is removed, and the shield 20 is restored by being rotated in a rotation direction of blocking light by elastic restoring force of the return spring 50 attached to the rotating shaft 22 of the rotary shield 20, and in this case, the shield controlling cam 40 is restored by being rotated in the opposite direction to the shield 20 by frictional force caused by contact with the cam contact portion 26.

Even during a process in which the rotary shield 20 is restored to the closed state, the contact state between the cam contact portion 26 and the shield controlling cam 40 is maintained, such that impact and noise caused by the operation of the rotary shield 20 do not occur until the cam contact portion 26 comes into surface-to-surface contact with the first flat surface portion 41 of the shield controlling cam 40.

That is, according to the shield driving device of the present invention, the shield controlling cam 40, which controls the rotational motion and the position of the rotary shield 20, controls the rotational motion of the shield 20 while maintaining the contact state with the rotary shield 20, thereby reducing noise and impact according to the operation of the shield 20.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shield driving device for a headlamp, which operates a rotary shield that selectively blocks a portion of light emitted from a light source to an aspherical lens, the shield driving device comprising:
   the rotary shield disposed in front of the light source, and performing a closing operation for blocking the portion of light from the light source, and an opening operation for unblocking the portion of the light while rotating about a rotating shaft;
   a shield controlling cam disposed below the rotary shield to be rotatable in a state of being in contact with a cam contact portion of the rotary shield, and rotating simultaneously with the cam contact portion by frictional force caused by contact; and
   an actuator which transmits rotational power to the shield controlling cam,
   wherein the cam contact portion is formed integrally with a lower portion of the rotating shaft of the rotary shield to be rotatable simultaneously with the rotary shield, and
   wherein front and rear central portions of a lower end surface of the cam contact portion which is in contact with the shield controlling cam have a curved surface, and front and rear edge portions of the lower end surface of the cam contact portion have a flat surface.

2. The shield driving device of claim 1, wherein the shield controlling cam has an outer circumferential surface which includes:
   a first flat surface portion which is in at least one of line-to-line contact and surface contact with the cam contact portion during an operation of closing the rotary shield;
   a second flat surface portion which is in at least one of line-to-line contact and surface contact with the cam contact portion during an operation of opening the rotary shield; and
   a curved surface portion formed between the first flat surface portion and the second flat surface portion and in line-to-line contact with the cam contact portion during an operation of changing closed and opened states of the rotary shield.

3. The shield driving device of claim 1, wherein a return spring, which produces elastic restoring force by being compressed as the closed state of the rotary shield is changed to the opened state, is disposed on the rotating shaft of the rotary shield.

* * * * *